United States Patent
Tu

(10) Patent No.: US 7,331,109 B2
(45) Date of Patent: Feb. 19, 2008

(54) ELECTRIC CUTTING DEVICE

(76) Inventor: Shu-Woan Tu, 3015 walnet grove ave., 213 Rosemead, CA (US) 91770

( * ) Notice: Subject to any disclaimer, the term of this patent is extended or adjusted under 35 U.S.C. 154(b) by 74 days.

(21) Appl. No.: 11/383,174

(22) Filed: May 12, 2006

(65) Prior Publication Data

US 2007/0261252 A1    Nov. 15, 2007

(51) Int. Cl.
  *B26B 17/00*    (2006.01)
  *B26B 15/00*    (2006.01)
  *B26B 13/00*    (2006.01)
(52) U.S. Cl. .................... 30/175; 30/180; 30/181; 30/228; 30/245
(58) Field of Classification Search .............. 30/175, 30/180, 181, 186, 187, 228, 237, 244, 245
See application file for complete search history.

(56) References Cited

U.S. PATENT DOCUMENTS

| | | | | |
|---|---|---|---|---|
| 1,572,546 A | * | 2/1926 | McKenney | 30/252 |
| 2,225,580 A | * | 12/1940 | Wiggins | 30/228 |
| 2,283,403 A | * | 5/1942 | Wiggins | 30/228 |
| 3,550,815 A | * | 12/1970 | Salonen | 222/146.5 |
| 3,693,254 A | * | 9/1972 | Salonen | 30/228 |
| 3,837,076 A | * | 9/1974 | Good, Jr. | 30/180 |
| 4,283,851 A | * | 8/1981 | Wolter | 30/134 |
| 4,506,445 A | * | 3/1985 | Esten | 30/228 |
| 5,083,971 A | * | 1/1992 | Karubian et al. | 452/64 |
| 5,272,811 A | * | 12/1993 | Armand | 30/228 |
| 5,331,742 A | * | 7/1994 | Schmode et al. | 30/245 |
| 2003/0145900 A1 | * | 8/2003 | Jensen et al. | 140/119 |
| 2005/0051014 A1 | * | 3/2005 | Baumuller et al. | 83/639.1 |

* cited by examiner

*Primary Examiner*—Joseph J. Hail, III
*Assistant Examiner*—Alvin J Grant

(57) ABSTRACT

An electric cutting device includes a housing, a motor, an activation button, a first assembly, a second assembly, two connecting rods, two connecting rods and a cutting assembly. The activation button may be used to activate the motor. The motor is connected with a speed reduction gear set, and a transmission gear is connected with the output shaft of the speed reduction gear set. The transmission gear is engaged with a driving gear. A threaded rod is fixedly connected with the driving gear. The two supporting rods are pivotally connected with the first assembly. The rear end of either connecting rod is connected with the front end of the corresponding supporting rod. In use, the motor may cause the threaded rod to rotate and then activate the cutting operation of the cutting assembly.

5 Claims, 5 Drawing Sheets

ELECTRIC CUTTING DEVICE

BACKGROUND OF THE INVENTION

1. Field of the Invention

The invention generally relates to an electric cutting device. More particularly, the invention relates to an electric cutting device that is electrically operated and can be used to cut up metal wires and other objects easily.

2. Description of the Prior Art

As of now, people use various types of tools to assemble household products and furniture by themselves. Some of the tools (such as power drill) have been developed into an electric tool; however, some of them (such as cutter) still remain a manually operated tool. During assembly, a person may use a cutter to cut up metal wires and other hard objects. If a thick metal wire is to be cut by such cutter, the person needs to use more force and more time to cut it up. In addition, the cutting of such thick metal wire may inflict a bodily injury to such person. For example, during the assembly of a bouquet of artificial flowers (with the stems made of wires), many bodily injuries have been caused due to the use of such manually operated cutter.

From the above, we can see that the conventional cutter has many disadvantages and needs to be improved.

To eliminate the disadvantages of the prior art cutter, the inventor has put in a lot of effort in the subject and has successfully come up with the electric cutting device of the present invention.

SUMMARY OF THE INVENTION

The present invention is to provide an electric cutting device that is used to cut up metal wires easily.

Another, the present invention is to provide an electric cutting device that is structurally simple, easy to manufacture and easy to use.

The electric cutting device of the present invention comprises a housing, a motor, a control circuit, an activation button, a first assembly, a second assembly, two connecting rods and a cutting assembly. A power supply unit is disposed in the lower portion of the housing so as to provide power to the motor. The activation button extends out of the housing and is used to activate the motor. The control circuit is connected with the motor and the activation button. The control circuit is used to activate the motor to rotate in a first direction or a second/reversed direction when receiving a signal from the activation button. The motor is connected with a speed reduction gear set. A transmission gear is connected with the output shaft of the speed reduction gear set and is engaged with a driving gear. A threaded rod is fixedly connected with the driving gear. The first assembly is threaded onto the rear portion of the threaded rod, and the second assembly is threaded onto the front portion of the threaded rod. The rear end of either supporting rod is pivotally connected with the first assembly. The rear end of either connecting rod is connected with the front end of the corresponding supporting rod. A bent portion is provided near the front portion of either connecting rod. Either bent portion is pivotally connected with the second assembly. The cutting assembly comprises a first cutting member and a second cutting member, and the rear end of either cutting member is connected with the front end of the corresponding connecting rod. When we press the activation button, the control circuit will activate the motor to rotate in a first direction. Now, the transmission gear may be rotated, and the driving gear and the threaded rod may be driven by the transmission gear. Also, the rotation of the threaded rod may cause the forward movement of the first assembly and the backward movement of the second assembly. Hence, the cutting assembly will be moved backwards and an object may be cut by the cutting assembly. After the object is cut, the control circuit may cause the motor to rotate in a second or reversed direction so as to be ready for the next time of cutting.

BRIEF DESCRIPTION OF THE DRAWINGS

These features and advantages of the present invention will be fully understood and appreciated from the following detailed description of the accompanying Drawings.

DETAILED DESCRIPTION OF THE PREFERRED EMBODIMENT

Figure 1:
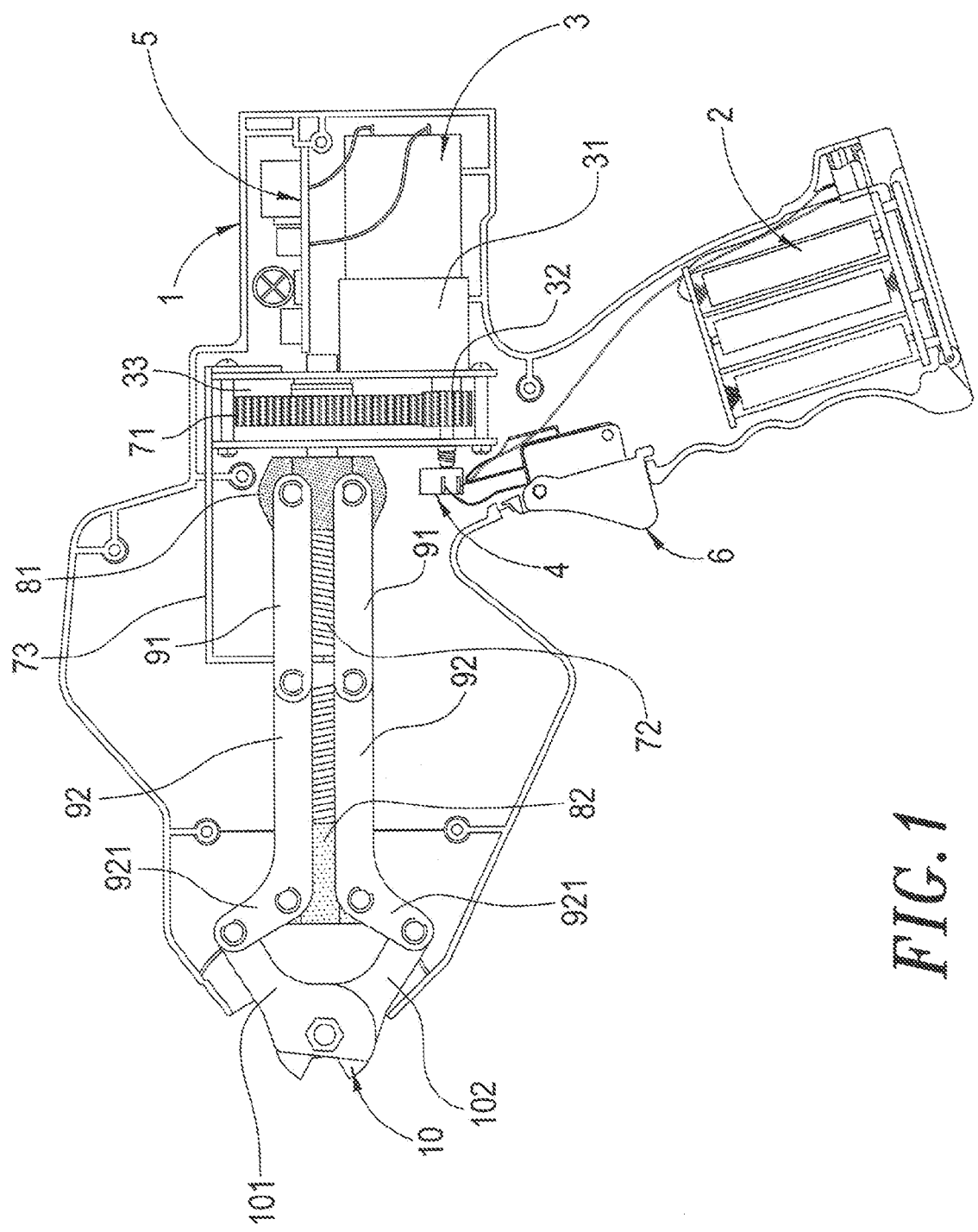
FIG. 1 is a sectional view of the electric cutting device of the present invention.
Figure 2A:
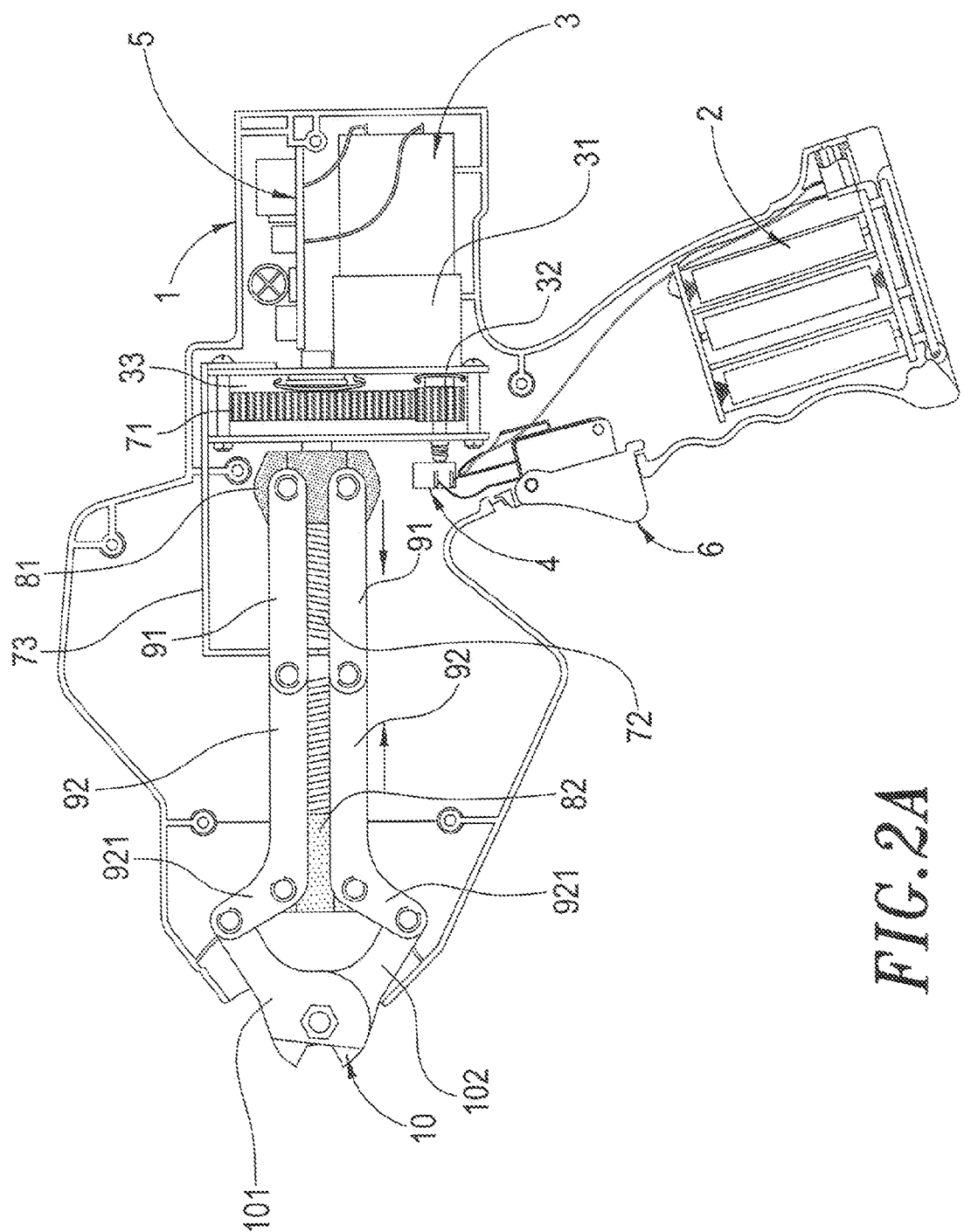
FIGS. 2A, 2B, 2C and 2D are four sectional views of the electric cutting device of the present invention, showing the electric cutting device in operation.
Figure 2B:
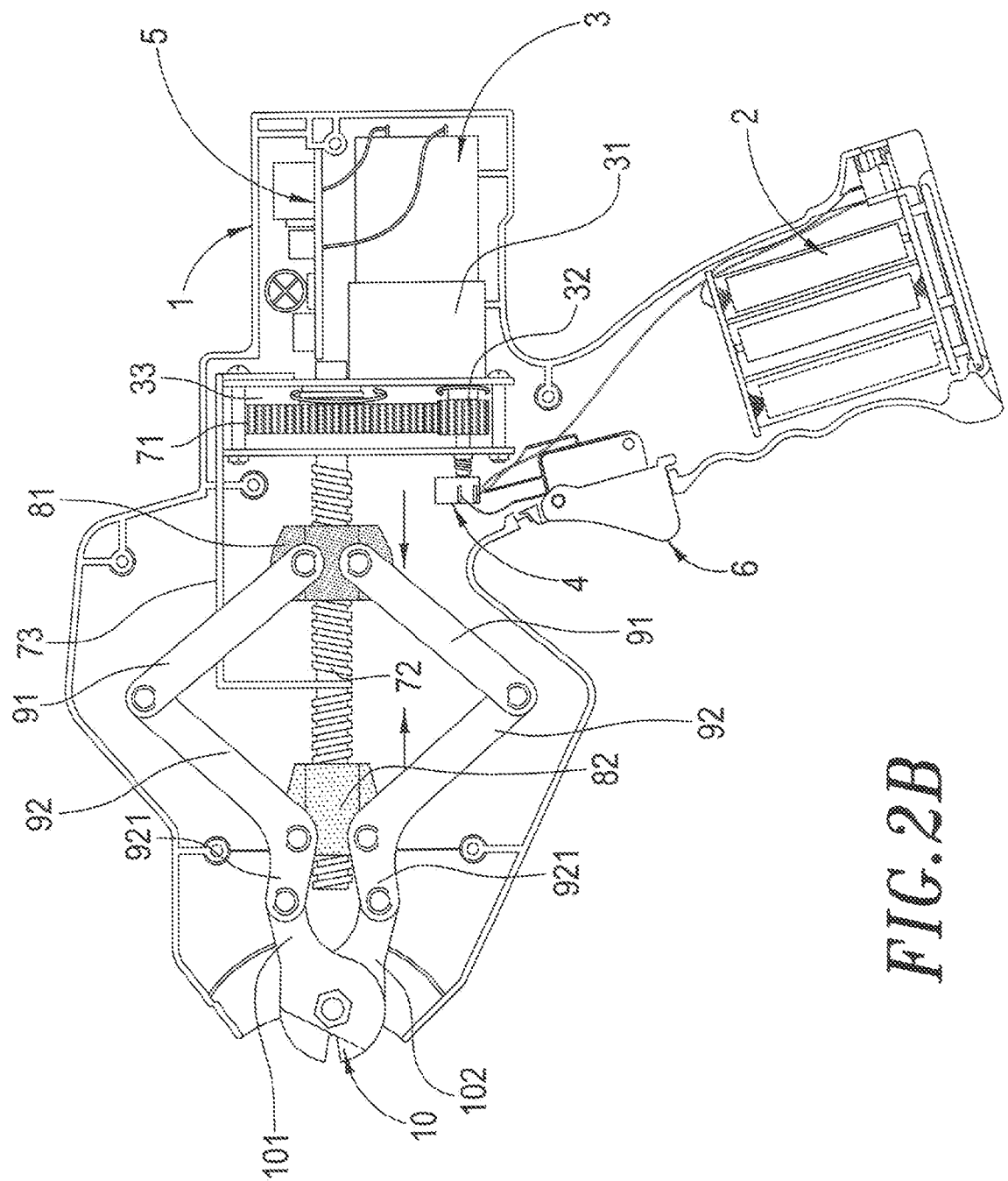
Figure 2C:
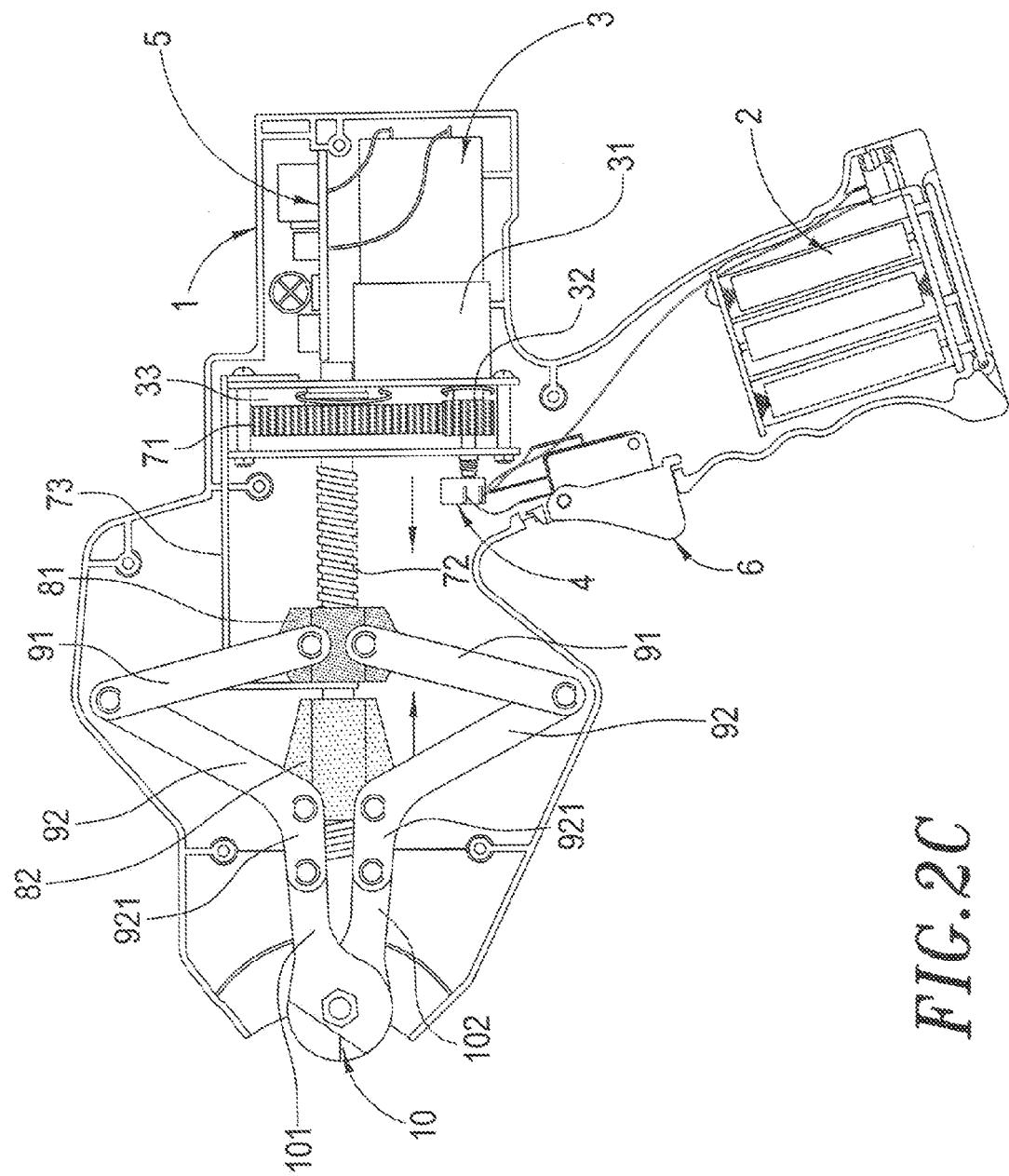
Figure 2D:
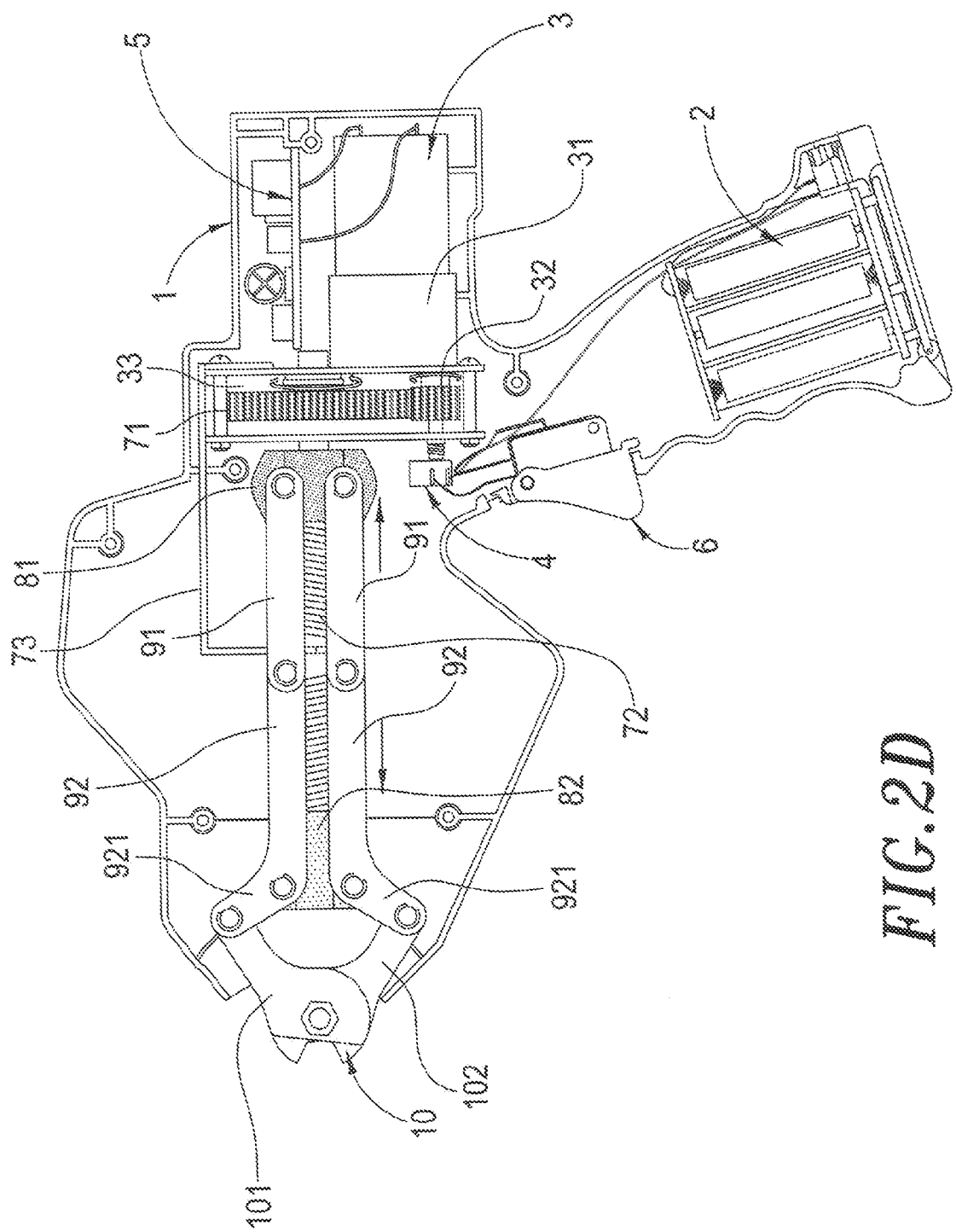

As illustrated in FIG. 1, the electric cutting device of the present invention comprises a housing 1, a motor 3, a power switch 4, an activation button 6, a control circuit 5, a driving gear 71, a threaded rod 72, a separation plate 73, a first assembly 81, a second assembly 82, two supporting rods 91, two connecting rods 92 and a cutting assembly 10.

A power supply unit 2 is disposed in the lower portion of the housing 1. The power supply unit 2 may be a regular battery, a lithium battery or a power source outside of the electric cutting device.

The motor 3 is disposed in the housing 1. The output shaft of the motor 3 is connected with a speed reduction gear set 31 so as to increase the torque output from the motor 3. Also, a transmission gear 32 is connected with the output shaft of the speed reduction gear set 31 and is disposed in a space 33 provided in front of the speed reduction gear set 31.

The power switch 4 extends out of the housing 1. The power switch 4 is connected with the control circuit 5 and may be used to control whether power is fed to the control circuit 5.

The activation button 6 extends out of the housing 1. The activation button 6 is connected with the control circuit 5 and may be used to activate the motor 3.

The control circuit 5 is disposed in the housing 1. The control circuit 5 is connected with the motor 3 and may be used to activate the motor 3 to rotate in a first direction or a second/reversed direction when receiving a signal from the activation button 6.

The driving gear 71 has a gear ratio larger than that of the transmission gear 32. The driving gear 71 is disposed in the space 33 provided in front of the speed reduction gear set 31 and is engaged with the transmission gear 32.

The threaded rod 72 extends from the central portion of the driving gear 71. The threaded rod 72 may be integrally formed with the driving gear 71 or may be later fitted onto the driving gear 71. The threaded rod 72 may move along with the driving gear 71. Also, the thread pattern of the front portion of the threaded rod 72 is a mirror image to the thread pattern of the rear portion of the threaded rod 72.

The rear end of the separation plate 73 is disposed on a wall of the space 33, and the front end of the separation plate 73 is disposed between the front portion and the rear portion of the threaded rod 72.

The first assembly 81 is threaded onto the rear portion of the threaded rod 72.

The second assembly 82 is threaded onto the front portion of the threaded rod 72.

The rear end of either supporting rod 91 is pivotally connected with the first assembly 81.

A bent portion 921 is provided near the front portion of either connecting rod 92. The rear end of either connecting rod 92 is connected with the front end of the corresponding supporting rod 91. Either bent portion 921 is pivotally connected with the second assembly 82.

The cutting assembly 10 comprises a first cutting member 101 and a second cutting member 102. The two blades of the cutting assembly 10 extend out of the housing 1. The rear end of either cutting member 101 and 102 is connected with the front end of the corresponding connecting rod 92.

Now, please refer to FIGS. 2A, 2B, 2C and 2D. In use, we first turn on the power switch 4. When we press the activation button 6, the control circuit 5 activates the motor 5 to rotate in a first direction. Now, the transmission gear 32 is rotated in a first direction, and the driving gear 71 and the threaded rod 72 are driven by the transmission gear 32. Also, the rotation of the threaded rod 72 causes the forward movement of the first assembly 81 and the backward movement of the second assembly 82. Now, the front portion of either supporting rod 91 moves outwards, and the rear portion of either connecting rod 92 also moves outwards. The outward movement of the two connecting rods 92 make the rear portion of the first cutting member 101 and the rear portion of the second cutting member 102 move towards each other (with the bent portion 921 as the pivotal point). Now, the cutting assembly is moved backwards, and a blade located at the front portion of the first cutting member 101 moves towards a blade located at the front portion of the second cutting member 102; hence, a wire or an object may be cut by the cutting assembly 10. After the wire or object is cut, the forward movement of the first assembly 81 is hindered by the separation plate 73; this causes the motor 3 to rotate in a second/reversed direction to make the threaded rod 72 to rotate in a reversed direction. Now, the reversed rotation of the threaded rod 72 may cause the backward movement of the first assembly 81 and the forward movement of the second assembly 82. Also, the front portion of either supporting rod 91 moves inwards to a horizontal position, and the rear portion of either connecting rod 92 also moves inwards to a horizontal position. Now, the two blades are moved into an open position and are ready for the next time of cutting.

In contrast to the prior art cutter, the electric cutting device of the present invention has the following advantages:

1. The electric cutting device of the present invention may be used to cut up metal wires easily.

2. The electric cutting device of the present invention is structurally simple, easy to manufacture and easy to use.

3. The torque output from the motor is substantially increased through a speed reduction gear set so that cutting may be done more easily.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An electric cutting device, comprising:
   a housing, with a power supply unit disposed in a lower portion of the housing so as to provide power to a motor;
   said motor, disposed in the housing and connected with a speed reduction gear set, wherein a transmission gear is connected with an output shaft of the speed reduction gear set and is engaged with a driving gear, and wherein a threaded rod is fixedly connected with the driving gear and a thread pattern of a front portion of the threaded rod is a mirror image to a thread pattern of a rear portion of the threaded rod;
   an activation button, extending out of the housing and connected with a control circuit;
   said control circuit, disposed in the housing and connected with the motor for activating the motor to rotate in a first direction or a second/reversed direction when receiving a signal from the activation button;
   a separation plate, with a front end disposed between the front portion and the rear portion of the threaded rod;
   a first assembly, threaded onto the rear portion of the threaded rod;
   a second assembly, threaded onto the front portion of the threaded rod;
   two supporting rods, pivotally connected with the first assembly;
   two connecting rods, with a bent portion provided near a front portion of either connecting rod, wherein a rear end of the either connecting rod is connected with a front end of a corresponding supporting rod and the bent portion is pivotally connected with the second assembly; and
   a cutting assembly, comprising a first cutting member and a second cutting member, wherein two blades of the cutting assembly extend out of the housing and a rear end of either cutting member is connected with a front end of a corresponding connecting rod.

2. The electric cutting device as in claim 1, wherein the power supply unit is a regular battery, a lithium battery or a power source outside of the electric cutting device.

3. The electric cutting device as in claim 1, wherein a space is provided in front of the speed reduction gear set so that the transmission gear and the driving gear are disposed in the space.

4. The electric cutting device as in claim 1, wherein a power switch extends out of the housing, and wherein the power switch is connected with the control circuit and is used to control whether power is fed to the control circuit.

5. The electric cutting device as in claim 1, wherein the driving gear has a gear ratio larger than that of the transmission gear.

* * * * *